June 15, 1965   P. L. V. FLAMANT ETAL   3,189,066
APPARATUS FOR PRODUCING UNIFORM WOOD CHIPS
Filed April 23, 1963   5 Sheets-Sheet 1
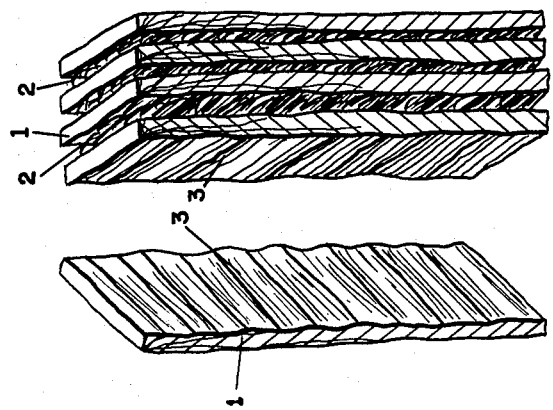
FIG. 3
FIG. 2
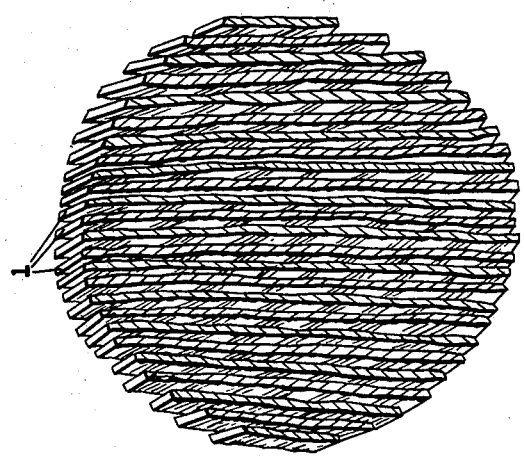
FIG. 1
INVENTORS
Pierre Louis Victor Flamant
Michel Jean-Marie Linares
BY 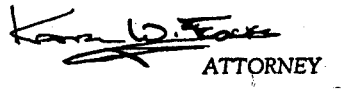
ATTORNEY

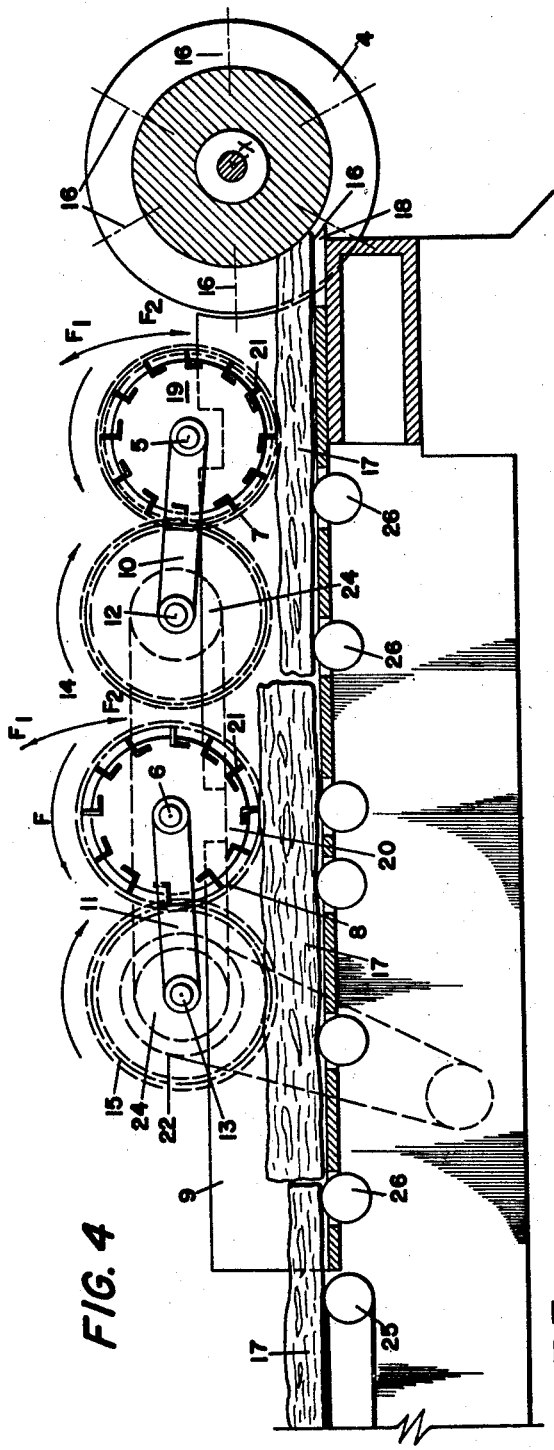
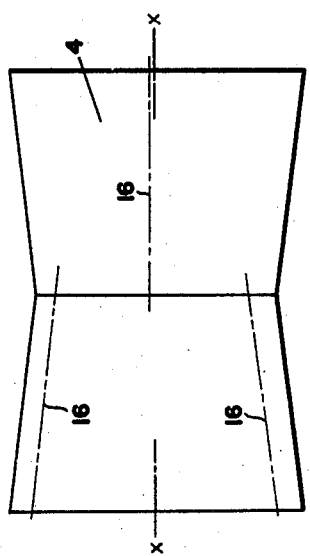
FIG. 4
FIG. 5
INVENTORS
Pierre Louis Victor Flamant
Michel Jean-Marie Linares
BY 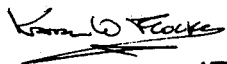
ATTORNEY

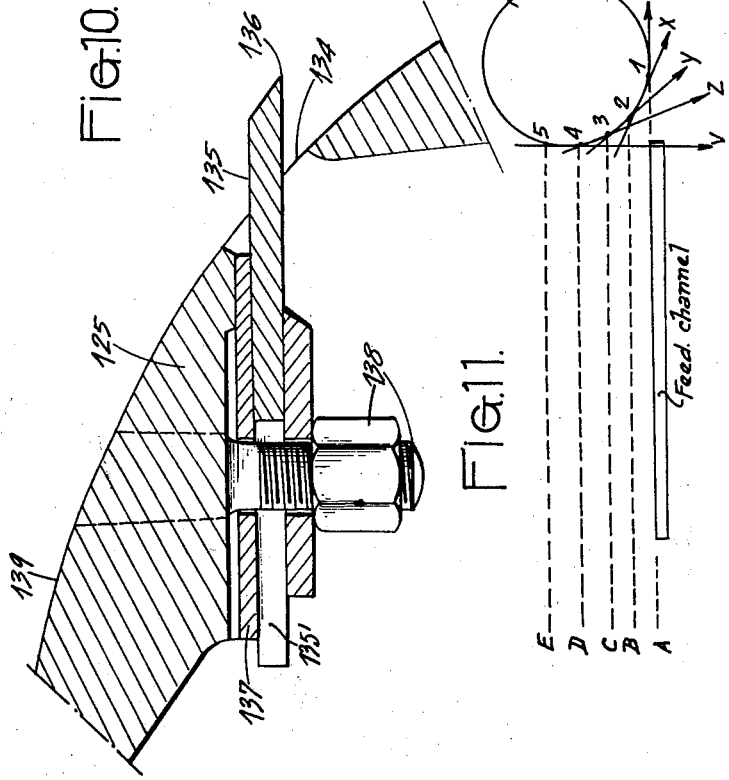
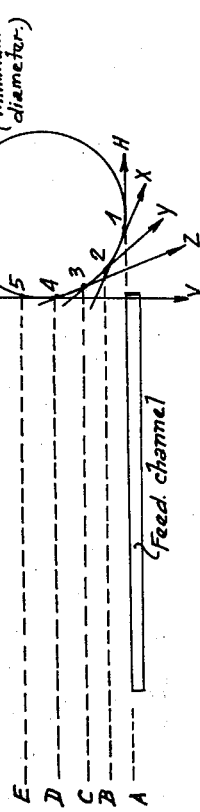
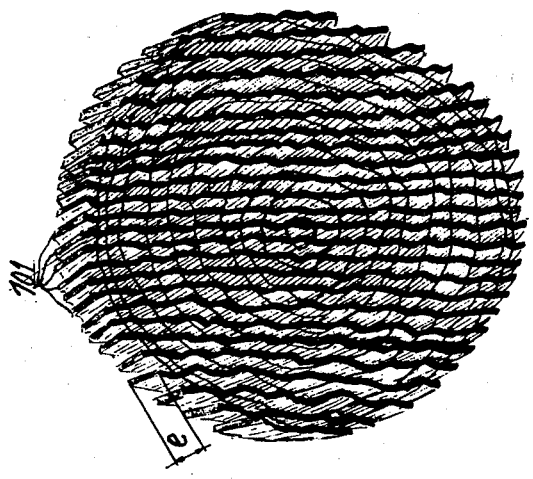

June 15, 1965  P. L. V. FLAMANT ETAL  3,189,066
APPARATUS FOR PRODUCING UNIFORM WOOD CHIPS
Filed April 23, 1963  5 Sheets-Sheet 4
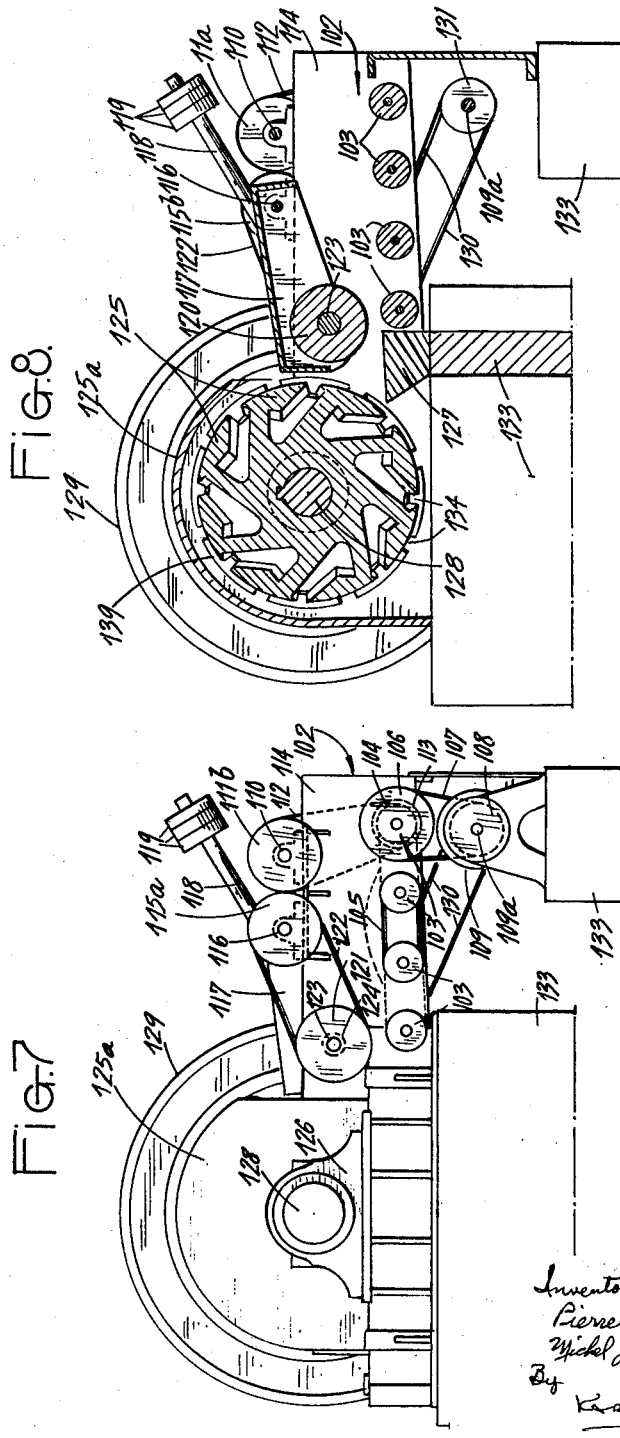
Inventors
Pierre Louis Victor Flamant
Michel Jean-Marie Linares
By
Karl W. Flocks
Attorney June 15, 1965  P. L. V. FLAMANT ETAL  3,189,066
APPARATUS FOR PRODUCING UNIFORM WOOD CHIPS
Filed April 23, 1963  5 Sheets-Sheet 5

United States Patent Office 3,189,066
Patented June 15, 1965

3,189,066
APPARATUS FOR PRODUCING UNIFORM WOOD CHIPS
Pierre Louis Victor Flamant, Auvers-sur-Oise, Seine-et-Oise, and Michel Jean-Marie Linares, Versailles, Seine-et-Oise, France, assignors, by mesne assignments, to Sertum, Geneva, Switzerland
Filed Apr. 23, 1963, Ser. No. 275,103
9 Claims. (Cl. 144—172)

This application is a continuation-in-part of applicant's co-pending application Ser. No. 7887 filed February 10, 1960, now U.S. Letters Patent 3,093,524, issued June 11, 1963 and comprises a continuation-in-part thereof.

The present invention relates to lamellated wood chips capable of being produced in quantity on an industrial scale, and, more particularly, the present invention relates to apparatus and a method for producing natural wood chips each shattered into a series of separate loosely interconnected lamellae in which the vast majority of separate individual component fibres have been almost completely separated one from another, suitable for use in such industries as paper-making.

It has previously been known to produce wood chips which are lamellated by cutting in order to expose a large effective surface area to a fluid treatment, no attempt being made to separate the individual component fibres one from another. Any fluid treatment to which these lamellated chips are subjected is lengthy and uneven due to the fact that the treating fluid must work its way from the exposed surface through a multitude of unseparated fibres in order to permeate the entire chip, and therefore surface fibres are subjected to the action of the treating fluid for a much longer period of time than those at the core of the lamella, and the penetration by the fluid being slow, difficult and irregular.

It has also been previously known to cut and crush wood chips in an attempt to separate at least some of the individual component fibres and allow quicker permeation by a treating fluid. However, this crushing not only damages a large proportion of the component fibres but re-orientates them into an entangled mass, deforming them in an unpredictable manner. In this heterogeneous mass of cut and crushed material particles of different sizes, different exposed effective surface areas and different densities are present, aimlessly distributed in the mass resulting from any one cut. Nor is there any certainty of consistency between one cut and another, even considering consecutive cuts made by the same machine on the same piece of timber.

Moreover, in the various processes current in industry for producing wood chips, suitable, for example, for pulping, no attempt has been made to shatter the wood chip by taking advantage of constraining forces directed on the chip at the time of cutting, nor has advantage been taken of the internal stresses induced in the chip as a result of external applied forces, or of the energy contained in the chip as it is cut to break the adhesion of the component fibres one from another in the natural timber.

It can therefore be understood that in the current state of the art, wood chips produced on an industrial scale for pulping are generally not conditioned satisfactorily for the treatments to which they are subsequently subjected.

For many years a means of manufacturing semichemical and mechanical-chemical pulps has been sought using deciduous wood and employing hot or cold chemical ingredients with or without pressure, and it is in this field particularly that chips suitably conditioned prior to pulping are required.

It has now been discovered that by directing constraining forces on the natural timber as it is being chipped, the chips produced shatter into a series of separate, substantially parallel lamellae, loosely interconnected, each lamella being separated from an immediately adjacent lamella by a plurality of projecting surface lignous fibres at random zones, requiring only a slight pull for complete separation, the said chips being ideally suited for pulping and analogous treatments.

The invention in its broader aspects contemplates feeding a supply of timber in the longitudinal direction of its component fibres to a cutting machine, wherein it is chipped, while applying constraining forces to the timber being chipped to prevent undue displacement of the timber and consequent loss of eneregy, whereby the chips shatter, on being cut, into interconnected parallel lamellae present a creped appearance and a very large exposed or effective surface area in comparison with a similar unshattered chip.

The lamellae obtained in accordance with the invention do not result from the direct effect of cutting, but rather from the effect of shattering due to forces opposing the adherence of the fibres to one another, which forces become greater than the said force of adherence on receiving impact energy from the cutter.

Each lamella is itself partially disaggregated, while remaining coherent, thereby forming a porous mass presenting bundles of lignous fibres distributed over its lateral surfaces, these lignous bundles interpenetrating with the lignous bundles projecting from the lateral surfaces of immediately adjacent lamellae. Each lamella is thus separated from adjacent lamellae by a certain distance, enclosing thereby a volume which is only occupied at random zones by the said lignous bundles interconnecting adjacent lamellae.

As the lamellae are separated from one another their lateral surfaces are exposed to any fluid into which the chip in accordance with the invention is required to be placed. The effective exposed surface area is accordingly made up on the one hand by the exposed core of each lamella constituted by separated fibres which form together a type of capillary tubing, and by the exposed lateral surfaces, which are themselves porous and of creped appearance, of each lamella.

In this new technique the impregnation of the chips plays a very important role and hence the shape of the chips, their regularity and their size have come in for particular study.

In the case of hot or cold impregnation of the chips their shape and size are of very great importance and it is imperative to obtain chips subject to very rapid penetration in order to cut the treatment time during continuous manufacture to a minimum.

Stated in another manner, in general, for the manufacture of paper, logs of wood usually of diameters between 8 and 14 centimetres, are first passed into wood-chipping machines or chippers in order to reduce the logs to small chips, after which these chips are treated for the purpose of preparing pulp. This pulp is then processed to paper.

The quality or grade of the finished paper is, however, dependent on the quality of the basic pulp. This pulp in turn derives its physical characteristics from the wood employed and from the behaviour of the chips during the preparation of the pulp.

It is well-known that the behaviour of wood chips during their treatment for the purpose of preparing pulp is mainly a function of two principal factors, which are:

(1) The quality of any desired final pulp depends on the condition of the lignous fibres treated, and the less these fibres are damaged both from the point of view of their natural dimensions and natural mechanical and physical properties, the better will be the quality of the pulp;

(2) The treatment liquor employed must be able to totally and rapidly impregnate each of the chips which form the charge being pulped in order that treatment and cooking take place in a uniform and homogeneous manner. This applies to a single species as well as a mixture of several species of wood in the batch for pulping.

These two primary conditions are found to be incompatible in practice in view of the present state of the art; in order to preserve the natural and undamaged state of the wood fibres, the minimum of cutting and crushing must be employed, whereas in order to permit the treatment liquor to impregnate totally and simultaneously all the fibres of a batch of chips, it would be necessary to reduce the wood employed into small particles in order to expose the largest possible surface, thus necessitating the reduction of the wood to very small chips or even to powder, which implies crushing the wood and corresponding damage of the fibres.

In view of these two apparently incompatible factors, a compromise has been adopted in the past between the necessary mechanical preparation and retention of the initial good condition of the undamaged fibres so as to give an optimum of quality for a given pulp.

It has already been previously proposed to provide wood chips in the form of thin flakes, these flakes being obtained by a succession of multiple cuts so as to expose a greater surface to the treatment fluid. There is, however, no method known which permits obtaining a chip, even in the form of a flake, with a single cutting operation, in which the constituent fibres are separated from each other without being damaged. With the most improved forms of chips actually known, such as for example those having striations or even lamellations, the treatment fluid penetrates into the chips in a slow and irregular manner, since the treatment fluid has to find its own path from the exposed surface to the heart of the chip, passing through a great number of fibres which are not separated from each other. It follows that the surfaces of the chips are subjected to the action of the treatment fluid for a much longer period than that for which the fibres at the center of the chip are exposed, and for a given chip, the penetration of the fluid is relatively slow, difficult and irregular.

It has also been previously proposed to cut-up logs into chips and to grind the latter so as to try to separate the constituent fibres of the wood, at least partially, and thus to permit of more rapid impregnation by the treatment liquor. However, this grinding or crushing operation not only damages a very large proportion of the fibres, but it re-orientates them, which results in a mass of tangled fibres which are deformed in an unpredictable manner. In this essentially irregular or even heterogeneous mass constituted by particles of ground and crushed materials of different sizes, different exposed effective surface areas and different densities are present aimlessly distributed in the mass comprising a given batch, even in the case of a single machine operating at constant speed and cutting the same log of wood.

It will therefore be readily understood that in the present state of the technique of paper-making, the wood chips obtained industrially for the purpose of preparing a pulp, utilizing conventional methods and machines, are not produced in a generally satisfactory condition for the treatments to which these chips must subsequently be subjected, given the very nature of any compromise such as that adopted between the mechanical preparation of the wood and the mechanical qualities of the fibres to be preserved.

Over a number of years, attempts have been made to produce semi-chemical and mechanical-chemical pulps by utilizing deciduous woods and employing semi-chemical reagents applied either hot or cold, with or without pressure, and it is in this case particularly that attention must be given, when it is desired to work with mixtures of woods, to ensure that the chips are in an appropriate state which permits of the best impregnation.

It has been found in the present invention by very closely controlling the mechanical handling of the timber, and by applying constraining forces to each log as it is being chipped, the chips produced shatter or in a sense "radically expand" on being cut into a series of separate, substantially parallel, thin lamellae, loosely interconnected, each lamella comprising substantially separated undamaged fibres and being separated from an immediately adjacent lamella by a plurality of projecting surface lignous fibres, at random zones, requiring only a slight pull for complete separation.

Chips of this kind have proved to be eminently suitable for the manufacture of paper pulp overcoming substantially all of the disadvantages inherent in chips obtained by conventional methods and with conventional machines. Since each chip is the result of only a single cutting action on the end of a log, the constituent individual fibres are practically undamaged. Furthermore, since each chip is shattered into a uniform porous mass, it can be impregnated very easily, very rapidly and completely by all treatment liquids to which it may be subjected, this total impregnation of each chip and of all the chips of the same batch taking place practically over the same period of time. It follows that the cooking operations to which the impregnated chips may be subjected take place in a uniform and regular manner.

In other words, the present invention avoids the necessity of resorting to a compromise between the two apparently incompatible factors referred to above, by finding the means for making them compatible and for preparing chips—i.e., the fibres, suitable for the formation of a pulp, with on the one hand a minimum of mechanical preparation (and of damage to the fibres) and on the other hand the maximum physical separation of the individual fibres.

It is therefore a primary object of the present invention to provide novel apparatus and a novel method to overcome previously inherent drawbacks of the prior art and to produce a natural wood chip which is not only in laminated form but in which almost all of the individual component fibres of each lamella are almost completely separated from one another while retaining points of adhesion to adjacent fibres along their length at random zones in order to present the maximum exposed effective surface area to be contacted by a treating fluid while remaining part of a coherent mass.

Another object of the present invention is to provide novel apparatus and a novel method producing wood chips suitable for pulping, for example, in the paper-making industry.

A further object of the present invention is to provide novel apparatus and a novel method for producing wood chips consistently having a larger exposed effective surface area than has been practical to obtain consistently heretofore in the industry.

An yet another object of the present invention is to provide novel apparatus and a novel method for producing wood chips which can be very rapidly and completely permeated with a treating fluid.

A still further object of the present invention is to provide novel apparatus and a novel method in which effective constraining forces on a piece of timber are utilized at the time which chips are being produced in order to effect substantially shattering of such chips.

And yet a still further object of the present invention is to provide novel apparatus and a novel method for producing wood chips in which advantage is taken of the reaction forces in the chip at the time it is produced from a piece of timber in order to effect shattering of the chip with separation yet retention of natural fibres in a substantially natural state.

And another object of the invention is to provide novel apparatus and a novel method to produce wood chips which are shattered in a substantially consistent and predictable manner.

And yet a still further object of the present invention is to provide novel apparatus and a novel method for producing shattered wood chips wherein the fibres thereof are substantially undamaged and maintained substantially parallel with respect to one another and in which such fibres are found in the normal direction as when in an unshattered natural state.

And yet another object of the present invention is to provide apparatus for producing wood chips in which the wood chips apparatus is adjustable for the purpose of chipping all forms and species of wood in their natural state and to reduce the wood to a shattered and laminated chip of a uniform and regular open structure, on an industrial scale, the chip being particularly intended for use in the paper-making industry.

And yet a still further object of the present invention is to provide a novel method which generally consists of passing a log of wood substantially in the longitudinal direction—i.e., in the direction of the fibres of which the log is composed, into apparatus having rotary cutting means in operative relation to a supply channel, and applying specific constraining means to the log in the immediate vicinity of the rotary cutting means in such a manner to oppose undesirable displacement of the log at the moment of cutting, while urging the log into the supply channel without preventing movement thereof towards the cutting means, and in cutting the log into chips at a fixed rate of cut by means of cutter blades with a pre-determined striking force, and forcing the chips produced to pass into said cutting means forwardly of the blades by which they are cut and through an opening of a pre-determined size and ejecting such chips laterally from the rotary cutting means by means of centrifugal force and through the utilization of the particular shape of the rotary cutting means, the force being applied by the constraining means, and the degree of projection of the cutting blades, the rate of cutting and the striking and cutting force of the dimension of the openings being adjustable according to the characteristics of the wood being cut.

The precise reasons why the wood which is cut in this particular manner shatters in such a regular way are not theoretically clear, and in consequence it is only possible to advance hypotheses in attempting to explain this phenomenon, it being understood that such hypotheses do not in any way restrict the scope of the invention, but on the other hand the invention has proved itself as will subsequently become apparent.

Accordingly, theoretical explanation of this phenomenon may be found within the field of the phenomena of machine tool vibration and shock. The study of this phenomena is however in its early stages at the present time and exhaustive analysis of the conditions governing the phenomena of "chatter" in machine tools and also the conditions governing the development and the maintenance of vibration, may eventually produce an empirically provable theory concerning the phenomena which is produced in the machine according to the invention.

In view of the lack of information of an authoritative nature in this field, there will be given below the various parameters of the machine, these parameters having been determined empirically by the applicants after having discovered the application of the phenomena of shattering to wood and having appreciated its importance, from the industrial point of view in the manufacture of paper.

In accordance with a preferred form of embodiment of the machine according to the invention, the latter takes the form of a rotary chipper of the "diabolo" type, that is to say the cutter drum is constructed in the form of two truncated cones connected together by their small bases, the "diabolo" thus formed being hollow and open towards its large bases. In accordance with the preferred embodiment, the constraining means are constituted by one or more rollers, driven, but able to rotate freely at a speed greater than the driven speed, in contact with the upper part of the log which passes below them, these rollers being biased in the vertical direction to maintain this continuous contact with the log and to apply thereto a substantially constant pressure.

The present invention has a particular advantage in that it provides a rotary cutting machine with adjustable parameters, the values of which may be set in order to deliver shattered wood chips continuously, having constant characteristics, from all varieties of wood.

In view of the fact that the shattered chips produced by the cutting machine of the invention consist of thin parallel lamellae of uniform thickness, each lamella having as its overall surface dimensions the thickness and the width of the chip to which it belongs, and since the thickness of each chip is constant, it will be appreciated that the overall surface dimensions of the various chips have no influence on the rapidity of penetration of any liquids employed for treating the chips, and that only the width of a lamella (that is to say the dimension which corresponds to the constant thickness of each chip) and the thickness of the lamella itself determine the rapidity of penetration for an entire batch of chips to be treated or intended for cooking.

As a consequence, the present invention provides a novel method of cutting logs of wood into chips so as to continuously obtain wood chips which are uniformly shattered in the manner previously described regardless of the species of wood, these chips being uniformly shattered for each species and suitable for the subsequent manufacture of a pulp either from a single species or a mixture of species of wood;

The invention provides a method for cutting logs into shattered chips which can be rapidly impregnated right through by any treatment of liquor, the time taken for impregnation being substantially constant, irrespective of the species of wood being cut;

The invention provides a method for cutting logs into shattered chips, the constituent fibres being practically undamaged and remain substantially parallel to each other and with respect to their normal direction in the wood in the natural state;

With the foregoing and other objects in mind, the invention resides in the novel apparatus and method for producing a novel wood chip, it being understood that changes in the precise exemplary embodiments herein disclosed will occur to those skilled in the art, and such changes are considered to be within the spirit of the invention.

Other objects and the nature and advantages of the instant invention will be apparent from the following description taken in conjunction with the accompanying drawings, wherein:

FIG. 1 shows in perspective a roundel of wood shattered in accordance with the invention;

FIG. 2 is a perspective view to a larger scale showing diagrammatically one component lamella of the roundel shown in FIG. 1;

FIG. 3 shows to a larger scale several lamellae of the roundel in FIG. 1, these lamellae being interconnected, in conformity with the invention, by a plurality of projecting surface lignous fibres;

FIG. 4 is a longitudinal section, substantially diagrammatic of one form of apparatus for obtaining the shattered chips of the invention;

FIG. 5 is an elevation of the rotary member, drum chipper or shattering cutter of the apparatus of FIG. 4, looking from right to left at FIG. 4;

FIG. 6 is another view in perspective of a shattered wood chip produced by the method according to the invention;

FIG. 7 is a side view, in elevation, of another form of an apparatus according to the invention;

FIG. 8 is a view in longitudinal section of the cutting machine shown in FIG. 7, with the blades removed;

FIG. 10 shows a large-scale detail of the mounting of the cutter blade; and

FIG. 11 is a diagrammatic view illustrating the theoretical "angle of attack" of a rotary cutter with respect to logs from which chips are produced.

Figure 9:
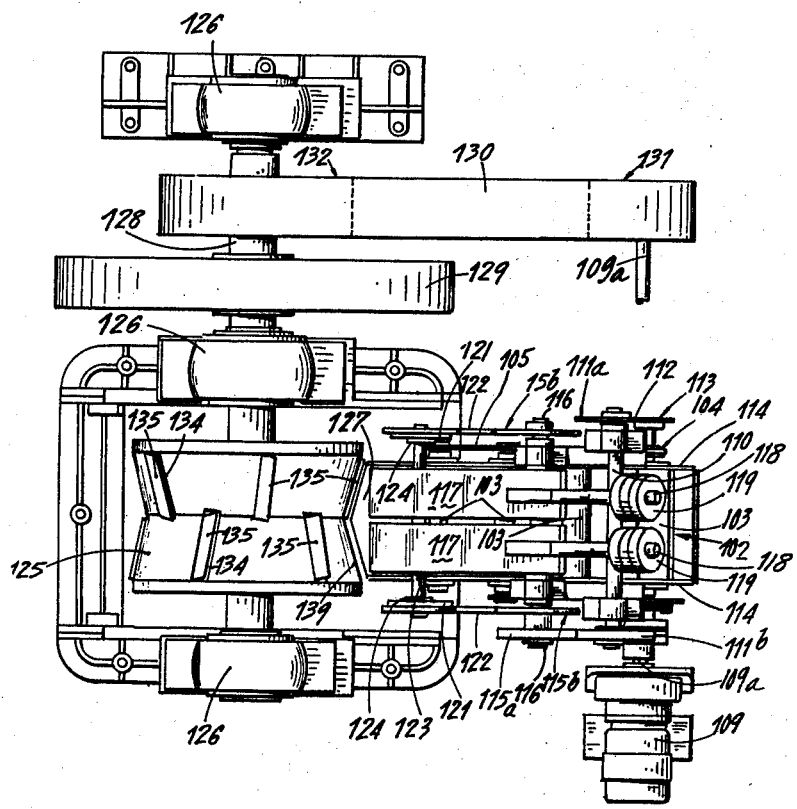
FIG. 9 is a plan view corresponding to FIG. 7, with the cover of the "diabolo" cutter removed.

In referring to FIGURES 1, 2 and 3 it can be seen that the chip presents lamellae 1 which are substantially parallel to each other and to the direction of the wood fibers in the natural state. These lamellae 1, as can be seen in FIG. 3, are interconnected at random zones by bundles of fibres 2. The component fibres 3 of each lamella 1 are themselves separated by shattering into a porous matrix while remaining interconnected, thereby constituting the lamella proper, which accordingly gives the appearance of a coherent porous body of partially disaggregated wood fibres.

Such chips with these advantageous characteristics can be used for many purposes amongst which their application to the manufacture of wood pulp for the papermaking industry is perhaps the most interesting. The present description is therefore being given in connection with the manufacture of wood pulp by way of example, it being understood that the invention is in no way limited to this particular use or application.

In the wood pulp industry it is known that, in manufacturing the pulp, use is made of wood chips of resinous or deciduous character which are obtained by a variety of machines styled "Chippers."

The chips transformed into pulp are generally of as regular size as possible (2 cm. long, 1.5 cm. wide and from 5 to 7 mm. thick). Most machines are designed to produce regular chips, however, it is customary, before use, that the chips be passed through classifying devices, and exceptionally large pieces are treated in mechanical crushers.

In the present invention classifying devices and crushers are unnecessary, and the sizes of the individual chips are unimportant except in respect of the length of fibre desired which is a function only of the thickness of the chip.

Generally speaking, the present invention provides chips which, by their structure and their very large exposed surface area, allow of rapid cold impregnation without the aid of any heat or pressure, or hot impregnation, by any liquid, for example caustic soda.

It is obvious that the impregnating liquid penetrates the chips in accordance with the invention due to the very large exposed surface area of the shattered lamellae, the enveloping faces of which are completely porous and present a substantially "creped" appearance.

It has accordingly been found that, for example, the impregnation of a normal chip which formerly required two and a half hours (cold and without pressure) can now be accomplished effectively in as little as 12 minutes or so with chips in accordance with the invention of comparable dimensions.

It is of course obvious that the character of the above described chip, permits easy impregnation in the case of chemical, semi-chemical, mechanical-chemical, or mechanical pulp manufacture, and can be advantageously used for an even greater efficiency in the manufacture of chemical pulps than is possible heretofore in conventional processes.

The exceptional permeability of these lamellated chips will entail substantial modification to the currently prevailing working conditions.

The chip such as shown in FIG. 1, contains lamallae parallel to a diameter of the round piece of timber from which it was produced.

The best results are obtained by sectioning the initial timber into chips of at least 1 mm. and preferably from 5 to 15 mm. thick.

The apparatus for producing these highly desirable and satisfactory chips will subsequently be described, and the process comprises feeding a piece of timber along feed means to a cutter, directing a constraining force to act on said piece of timber at a point located on the surface of said piece of timber opposite to that surface of said piece of timber in contact with said feed means and in close proximity to the extremity of said piece of timber nearest to said cutter, and cutting said piece of timber into a plurality of chips in such a manner that, at the moment of cutting, the wood, subjected to said constraining force, in addition to the other forces produced by the machine, absorbs a considerable quantity of energy of impact, which causes shattering of the chip due to this impact energy together with the energy provided by the other forces, e.g. constraining, reaction, friction, vibration, etc., being freed or restored at the moment when the chip is cut.

The wood is preferably fed in the longitudinal direction of its component fibres towards the cutter.

In order to do this, one embodimnt of the apparatus is a rotary cutter—i.e., a machine carrying cutter blades mounted on a rotary member. It is also preferable that the wood be firmly maintained against the rotary member in order to avoid any relative displacement of this wood, that the cutting speed be relatively high, and that either the angle formed between the longitudinal axis of the timber (which is fed substantially in the longitudinal direction of its component fibres) and a plane passing through the axis of the rotary cutter of the apparatus measured between the longitudinal axis of the timber and the direction in said plane parallel to the rotary axis of said cutter member from its point of interpenetration with said plane, or the angle of the cutter blades of the cutter machine with respect to the longitudinal direction of the component fibres of the timber, be comprised between 0° and 90°; see FIG. 11.

The rotary cutter and feed channel are spaced with respect to each other, and the extension of the top surface of the feed channel must not pass beneath the smallest diameter section of the diabolo-shaped rotary chipper. Any log of wood passing lengthwise along the feed channel to the chipper will be attacked by the peripheral cutter blades on the chipper in an arcuate movement. As the curvature of the chipper is large compared with the overall dimensions of the chips produced, the cut faces of the chips will appear substantially planar and parallel, the angle between the planes and the longitudinal direction of the fibres in the original log being a function of many factors of a practical nature impossible to generalize with absolute accuracy.

Considering an ideal case, where a log to be chipped is composed of completely straight fibres all parallel to one another, and to the top surface of the feed channel, when the log is placed thereon with one end facing the chipper, and considering the chipper to be cylindrical to avoid lateral angle complications, one generatrix of this "perfect" log must follow the top surface of the feed channel in passing through the chipper.

As seen in FIG. 11, if the log has diameter A-B, then it will be chipped along the arc 1-2 of the chipper, the angle of cut varying about the mean tangent X. If the log has diameter A-C, then it will be chipped along the arc 1-3 of the chipper, the wood located between levels A and B being subjected to the same angle of cut as before (mean tangent X) and that between levels B and C being subjected to an angle of cut for which the mean is shown by tangent Y. Similarly, for a log of diameter A-D, it is chipped along the whole arc 1-4, the mean tangent Z being considered for levels C to D in addition to those already mentioned for the other levels, etc.

Of course, this is a gross over-simplification of the actual conditions but sufficiently illustrates how any particular chip sample of the invention is located as it is being cut, and demonstrates the condition of the exposed surfaces or faces of the chip with respect to its fibre direction.

As will be seen, the two extreme cases are the horizontal tangent at the bottom of the rotary chipper and the vertical tangent at the extreme left of the chipper as illustrated, the angle of cut varying between 0° and 90°. The majority of the chips are derived from the central region of the log (where it is the most voluminous) and as a rough average this hits the chipper at about its middle. And thus, for purely descriptive purposes, the plane of cut is stated to be "substantially perpendicular" as this would be true for the majority of chips produced from a given log.

The following description will be given, by way of example, for an apparatus for carrying out the process for producing chips according to the invention, using a type of chipper hereinafter referred to as a "diabolo" i.e. a chipper whose rotary member comprises two coaxial truncated cones joined together by their small bases and whose cutter blades are mounted along generatrices of these truncated cones in accordance with the desired angle.

Referring now to FIGS. 4 and 5, the rotary chipper member or drum of the apparatus is represented by the reference 4. The feed to the chipper is effected along a preferably horizontal channel 9, this channel being therefore perpendicular to the vertical plane passing through the axis X of the drum 4 of the machine. The longitudinal axis of the feed channel can be located slightly below axis X. The channel comprises (in accordance with its length) one or more rollers such as 26, penetrating the bottom of the channel 9, to transport the logs of wood 17 towards an anvil 18 where it is cut by the cutter blades 16 projecting radially from the periphery of the cutter blade carrier or drum 4. Preferably, the distance between the edge of the anvil 18 and cutter blades 16 is only sufficient to allow for a working clearance, i.e., it is a minimum.

Acting in conjunction with the rollers 26 are one or more rollers such as 19 and 20 mounted above the channel and bearing spikes 21 or any other device capable of gripping and pulling the wood 17 toward cutter 4.

These rollers constitute at the same time both the feeding means and the constraining means for the wood. It is desirable that the roller 19 be situated as close to the drum 4 as is practical.

Each of the rollers 19 and 20 consist of several wheels spaced laterally (not shown) and biased co-axially, but capable of independent vertical displacement, in order to allow (in accordance with the width of channel 9) several logs of timber of different diameters to be accommodated at the same time.

Each of these wheels are mounted on separate shaft elements, biased co-axially, forming a set of shafts 5 in roller 19, and a set of shafts 6 in roller 20.

In the installation illustrated in the drawings both rollers 19 and 20 have represented as consisting of one wheel element each, in order to simplify the description.

Each of the shafts 5 and 6 bears on one or both extremities gear-wheels such as 7, 8 locked on the shafts 5, 6. Each of these assemblies turns between pairs of arms such as 10, 11, this rotation taking place in the direction of arrows F. The arms 10, 11 are freely mounted, on the one hand on shafts 5, 6 and on the other hand on shafts 12, 13.

The arms 10, 11 are therefore mounted so that they can pivot about the shafts 12, 13 and raise or lower the assemblies mounted on shafts 5, 6 in an arcuate path indicated by arrows $F_1$, $F_2$ as a function of the diameters of the timber in contact with the rollers 19, 20, together with the displacement of the upper contour of said timber with respect to the channel as the said timber passes rollers 19, 20 so that said rollers always ride the upper contour of the timber with which they are in contact.

The shafts 12 and 13 are mounted in bearings (not shown) located on the upper part of channel 9. At the end of these shafts gearwheels such as 14, 15 each engage with corresponding gearwheels 7, 8. The last gear assembly such as 15 of the whole device engages with a chain drive 22 driven by a reducing motor (not shown) bearing a drive pinion 23. This reducing motor can be replaced by a motor of any kind comprising a control device allowing the speed of the assembly to be varied in accordance with the species of wood to be cut, its dryness or the controllable projection of the cutter blades 16 from the chipper 4 which thereby draws the wood more or less quickly along its longitudinal axis.

The driven assembly for the rollers 19 and 20 can be accomplished by means of chain drives such as 24, driving one or more of the rollers.

With the rollers 19, 20 mounted in this manner, they can, while rotating, ride up or down according to the different thicknesses and sizes of the pieces of timber fed to the machine.

The roller 19 is mounted on its shaft 5 through a freewheel mounting (not shown) so that said roller, driven through gear 7, feeds the wood towards the cutting machine and, should the wood be drawn longitudinally faster by the cutter, roller 19 would then rotate faster than it is being driven through gear 7 thereby freewheeling on its shaft 5.

The rollers 26 can be smooth or fluted, and can be driven, which thereby allows a more regular advance of the various pieces of timber to take place. These rollers can be driven by conveyor belt 25.

The channel 9 can be adjusted laterally (not shown) to present the end of the logs to the cutting machine so that the longitudinal axis of the said timber makes any desired angle with the cutting edge of the cutters mounted on said cutting machine in order to produce the desired chips. With the "diabolo" cutter, it is preferable that the longitudinal axis of the channel be in the plane of the small bases of the truncated cones and the slope angle of the truncated cones, and hence the angle of attack of the blades mounted thereon, the cutting portions being mounted at the desired angle tangentially to the periphery of the cone.

Still further, although, not shown, the arms 10, 11 can be replaced by springs, or rollers 19, 20 can be directly mounted in a vertical spring or hydraulic or pneumatic suspension system adapted to provide for the desired vertical displacement of the said rollers.

By working in accordance with the process of the invention, the pieces of wood always are subjected to external constraining forces in a machine of the type described above, the wood shatters into lamellae as it is cut, thereby giving a product such as that shown by way of example in FIG. 1.

It is to be noted that any knots which are found in the wood to be chipped are also shattered into lamellae with the rest of the chip on being cut.

It is to be observed that the present apparatus and method provides an entirely new form of natural wood chip as claimed in said Patent No. 3,093,524, whose properties are substantially predictable and constant, capable of being formed from any species of natural timber whether deciduous or coniferous, thereby avoiding the necessity of grading and sorting timber for processing when clearing virgin forest.

Not only does the invention facilitate forest clearing by being applicable to all species of timber, but the chips produced from each species of timber are immediately suitable for fluid treatment without further processing, such as, for example, sorting into sizes and crushing the larger chips. This is by virtue of the fact that they are shattered on being cut into a series of loosely interconnected lamellae whose individual component fibres are almost completely separated from one another thereby endowing the chip with the property of exceptionally high and rapid permeability to a treating fluid.

Referring now to FIG. 6, there is shown a wood chip shattered into a series of thin separate lamellae 101 loosely connected to each other, these lamellae being substantially parallel to the direction of the fibres of the wood in the natural state, each lamella being connected to the immediately adjacent lamella by bundles of fibres distributed in a haphazard manner. These chips have a constant thickness $e$ for a given cut. Depending on the setting of the machine, it is thus possible to obtain chips having a thickness which can be regulated up to 20 mm.

The apparatus makes it possible to obtain such chips shattered in a constant manner and on an industrial scale from all species of woods whether they are deciduous woods or resinous woods.

Since mechanical and physical properties and "reaction" to stress may vary to a considerable extent from one species of wood to another, and since these properties and/or "reaction" are also affected by conditions such as moisture content, degree of seasoning, etc., it has been found that certain parts of the cutting machine according to the invention should be made adjustable in order that the machine may give optimum shattering for each particular batch of wood.

In order to effect the invention, a preferred form of construction of the cutting machine according to the invention is that illustrated in FIGS. 7 to 10. Referring to these figures, the cutting machine comprises a wood feeding channel 102, substantially horizontal and provided with a roller conveyor 103 driven in rotation by a toothed wheel 104 and a series of chains 105, the wheel 104 being concentric with and driven by a friction wheel 106 which is driven in turn by means of the chain 107 from the toothed wheel 108 keyed on the shaft 109a of a motor 109 provided with a speed variator.

Above the feed channel 102, and carried by the side walls of this latter, is mounted a shaft 110 at right angles to the longitudinal axis of the channel 102, and at each extremity of this shaft 110 is keyed a toothed wheel 111a and 111b, the wheel 111a being driven in rotation by the chain 112 which is driven in turn by a wheel 113 concentric with the wheel 104.

On the downstream side of the wheels 111a and 111b, there is mounted on the side walls 114 of the channel 102, a shaft 116, on the extremity of which is keyed a toothed wheel 115a which engages with the corresponding pinions of the wheel 111b. On the shaft 116 of the wheel 115a is pivotally mounted a pair of separate units which form the constraining means. Each separate unit comprises a support structure 117 pivotally mounted on the shaft 116 and terminating in an arm 118 along which counterweights 119 can slide and be fixed in any desired position. Each support 117 carries a roller 120 or so-called "pressure roller" capable of being driven in rotation by a pinion 121 which can in turn be driven by means of a chain 122, and the corresponding wheel 115b, rigidly fixed on the shaft 116 of the wheel 115a. Each pinion 121 is mounted on the shaft 123 of the pressure roller 120, with which it is associated through the intermediary of a so-called free-wheel device 124, so as to permit each pressure roller 120 to rotate freely at a speed greater than that of its pinion 121. Each pressure roller 120 extends approximately one-half of the width of the feed channel 102. In this way there is provided two pressure units independent of each other.

By suitably adjusting the position of weights 119 along the lengths of the arms 118, a mechanical moment about the shaft 116 is produced such that the pressure rollers apply a pre-determined force on the logs of wood fed in, which force remains constant while the pressure rollers 120 rise or fall according to the diameters of these logs.

On the downstream side of these pressure devices 120 and at the extremity of the feed channel 102, is mounted a cutter proper, which is constituted by a drum 125 having the form of a "diabolo" (that is to say of two truncated cones fixed together by their small ends). This drum 125 is mounted on bearings 126 in such manner that its periphery 139 is as close as possible to the pressure rollers 120 and also as close as possible to an anvil 127 which extends into bottom of the channel 102. A removable protection or safety hood 125a is provided round the said drum. On the shaft 128 of the "diabolo" is keyed a fly-wheel 129. This latter may be interchangeable so as to enable the total moment of inertia of the drive system of the apparatus to be modified.

The power system for the cutter 125, the fly-wheel 129, comprises a driven pulley 132 on a shaft 128 common to the fly-wheel and cutter, which is driven by a motor, for example the motor 109, through the intermediary of a belt 130 and pulleys 131 and 132; the pulley 131 being keyed on the driving shaft 109a of the motor 109 and the pulley 132 being fixed on the shaft 128 of the diabolo.

The chipping apparatus of the invention is mounted on a solid stable base, such as blocks of concrete, indicated diagrammatically in the drawings by the reference 133.

The drum 125 of the apparatus is shown in cross section in FIGS. 8 and 10. On the periphery 139 of the drum are formed openings 134 to permit the passage of blades 135. These blades are mounted so that their cutting edges 136 project through the openings 134 of the drum a distance corresponding to the desired thickness of the chips. The openings 134 can be varied by means of wedges such as 137 inserted between the blades and their seats on the drum 125 and the wedge-knife assembly is secured on the drum by a locking device, for example by bolts and nuts 138. The blades will not project to such an extent as to strike the anvil 127 when the drum 125 rotates, nor will they strike the pressure rollers 120.

The angle made by each blade with the tangent to the drum at the point where the blade is just level with the surface, is preferably of the order of 38°, and the maximum projection of the knives radially is of the order of 20 mm.; the total peripheral opening of each orifice is of the order of 5 cm. The blades are mounted to be adjustable by means of slots 135', for example, with respect to the drum surface in order to cut chips of all thickness; and it has proved preferable to limit the maximum radial projection and in consequence the maximum thickness possible of the chips to about 20 mm.

The apparatus is adjusted according to calculations and data obtained empirically, since initial tests on the apparatus are accomplished on all pertinent species of wood, in order to establish the conditions for optimum desired shattering for each species of wood. The machine is started and the logs are charged one after the other into the feed channel 102, one of their extremities being directed towards the drum 125, and each log is automatically conveyed by the conveyor device 103 into the channel 102, and during the course of its travel it is forced under pressure rollers 120 which rise while remaining constantly in contact with the log irrespective of variations in its diameter, after which the log is drawn toward the blades 135.

When the log comes into contact with the blades 135 of the drum 125, it is cut into chips (the blades acting by cutting the wood, which is fed into the lower half of the diabolo), it is drawn forward by the cutting action at a speed which exceeds the driving speed of the conveyor device 103, which causes the pressure rollers 120 to rotate at a speed greater than their normal driven speed, and thus the rollers 120 rotate freely while remaining in continuous contact with the logs and prevent any undesired vertical or lateral displacement of the logs while they are being cut.

The chips pass into the openings 134 in the drum, formed below the cutting edges of blades 135 and, by reason of the double conical form the diabolo 125, and centrifugal force due to rotation, the chips which are now in a shattered condition are evacuated through the large open ends of the truncated cones. They are then collected for the purpose of subsequent treatment.

It has been stated above that, before being put into operation, the machine is adjusted in accordance with the indications obtained empirically during the initial tests of the machine on various varieties or species of wood.

In order to understand more clearly this empirical regulation of operating conditions, there are given below the results of tests carried out during the adjustment of a practical construction of the apparatus in accordance with the present invention, it being understood that these data are only given by way of illustration, relative to one size of apparatus, and that each machine constructed must be subjected to similar initial tests in order to determine the proper conditions of operations.

The apparatus on which tests were carried out had the following characteristics:

Diabolo:
  Length _____ mm__  540
  Maximum diameter _____ mm__  850
  Minimum diameter _____ mm__  770
  Number of knives _____(100 kgs.)__  16
  Weight _____ kgs__  690

Shaft:
  Length _____ m__  2.45
  Diameter _____ mm__  200
  Weight _____ kgs__  600

Fly-wheel:
  Diameter _____ m__  1.58
  Thickness of rim _____ mm__  210
  Width of ring _____ mm__  260
  Weight _____ kgs__  2150

Diabolo driving pulley:
  Diameter _____ mm__  750
  Thickness _____ mm__  250
  Weight _____ kgs__  380

PRESSURE DEVICE

Weight of load of each unit without counter-
  weight applied through pressure rollers_kgs__  105
Weight of counterweights _____ kgs__  70
Lever arm of constraining weight _____ mm__  430
Lever arm of counterweights _____ mm__  425–535
Driven speed of pressure rollers (i.e. minimum
  speed) _____ r.p.m__  28

TABLE I

*Adjustment tests on a cutting machine of the invention*
SPECIMEN: LANDES PINE
[Speed of rotation of diabolo: 400 r.p.m.]

| Test No. | Projection of knives in mm. | Normal width of cutter opening in mm. | Lever arm of counter-weights in mm. | Average lamella after shattering | | Remarks |
|---|---|---|---|---|---|---|
| | | | | Width in mm. | Thickness in mm. | |
| 1 | 15 | 18 | 525 | 14.68 | 4.91 | Width variable from 14 to 25 mm., lamella thickness 3.4 to 6.3 mm. |
| 2 | 14 | 15 | 525 | 16–18 | 2–3 | Fairly uniform. |
| 3 | 12 | 15 | 525 | 15 | 3–4 | Irregular. |
| 4 | 12 | 18 | 535 | 14–22 | 3–5 | Very irregular—no samples. |
| 5 | 11 | 13 | 525 | | | Shattering irregular, very thick. |
| 6 | 11 | 14 | 525 | 15–16 | 3.5 | Good shattering, good uniform cut. |
| 7 | 10 | 10 | 515 | | | Very bad shattering, counterweight too far forward. |
| 8 | 10 | 13 | 525 | 12.32 | 4.24 | Cut very irregular. |
| 9 | 10 | 14 | 525 | 12–15 | | Very bad shattering. |
| 10 | 10 | 15 | 525 | 11–33 | 2.5–4.5 | Irregular shattering. |
| 11 | 9.5 | 13 | 535 | 10.72 | 4.04 | Index of speed variator 9, very uniform cut, perfect chips. |
| 12 | 9.5 | 15 | 535 | 11.17 | 3.96 | Irregular chips, wedges 5 mm. better result. |
| 13 | 9 | 13 | 525 | 11.8 | 3.15 | Bad shattering. |
| 14 | 9 | 15 | 525 | 11–12 | 2.5–4.5 | Regular chips. |
| 15 | 8 | 13 | 535 | 10.74 | 4.12 | Irregular cutting. |
| 16 | 8 | 13 | 515 | 10.07 | 4.56 | Less irregular, counterweight too far forward. |
| 17 | 8 | 13 | 525 | 9.26 | 3.59 | Cut more uniform. |
| 18 | 15 | 18 | 525 | 19.2 | 5.52 | Shattering very bad. |

TABLE II

*Adjustment tests on a cutting machine of the invention*
SPECIMEN: POPLAR
[Speed of rotation of diabolo: 400 r.p.m.]

| Test No. | Projection of knives in mm. | Normal width of cutter opening in mm. | Lever arm of counter-weights in mm. | Average lamella after shattering | | Remarks |
|---|---|---|---|---|---|---|
| | | | | Width in mm. | Thickness in mm. | |
| 1 | 14 | 15 | 525 | 20 | | Bad shattering. |
| 2 | 12 | 18 | 535 | 14–16 | 3–3.5 | Irregular shattering and length of cut. |
| 3 | 11 | 14 | 525 | 13–14 | 3 | Fairly good, very fine cut. |
| 4 | 10 | 13 | 525 | 11.24 | 3.26 | Very irregular cut. |
| 5 | 6.5 | 13 | 535 | 11.24 | 2.81 | Good shattering, regular. |
| 6 | 9.5 | 15 | 535 | | | No samples, irregular. |
| 7 | 9 | 13 | 525 | 12.4 | 2.85 | Good cut, fairly regular. |
| 8 | 9 | 15 | 525 | 10–12 | 2–2.5 | Irregular shattering. |
| 9 | 8 | 13 | 535 | 10.6 | 3.29 | Irregular cut, speed of variator too high. |
| 10 | 15 | 18 | 525 | 15.94 | 4.39 | Very bad shattering. |

TABLE III

*Adjustment tests on a cutting machine of the invention*

SPECIMEN: OAK

[Speed of rotation of diabolo: 400 r.p.m.]

| Test No. | Projection of knives in mm. | Normal width of cutter opening in mm. | Lever arm of counter-weights in mm. | Average lamella after shattering | | Remarks |
|---|---|---|---|---|---|---|
| | | | | Width in mm. | Thickness in mm. | |
| 1 | 11 | 14 | 525 | 14-15 | 3.2 | Not very regular. |
| 2 | 10 | 10 | 525 | | | Very bad shattering. |
| 3 | 10 | 13 | 525 | 11.54 | 3.73 | Cutting very irregular. |
| 4 | 10 | 14 | 525 | 12.8 | 3.67 | Better shattering. |
| 5 | 9.5 | 13 | 535 | 11.47 | 3.38 | Good regular cut. |
| 6 | 9.5 | 15 | 535 | | | No samples, irregular. |
| 7 | 9 | 13 | 525 | 11.3 | 3.26 | Irregular cutting. |
| 8 | 8 | 13 | 535 | 9.74 | 3.83 | Do. |
| 9 | 6.5 | 13 | 525 | 8.15 | 2.57 | Width slightly irregular. |
| 10 | 6 | 13 | 525 | 7.55 | 2.27 | Average figure for 20 samples. |
| 11 | 15 | 13 | 525 | 15.36 | 4.65 | Bad shattering. |

TABLE IV

*Adjustment tests on a cutting machine of the invention*

SPECIMEN: RESINOUS AMERICAN (SPRUCE FIR)

[Speed of rotation of diabolo: 400 r.p.m.]

| Test No. | Projection of knives in mm. | Normal width of cutter opening in mm. | Lever arm of counter-weights in mm. | Average lamella after shattering | | Remarks |
|---|---|---|---|---|---|---|
| | | | | Width in mm. | Thickness in mm. | |
| 1 | 12 | 15 | 525 | 14.5 | 4.5 | Very irregular. |
| 2 | 11 | 13 | 525 | 11.54 | 4.11 | Irregular length of cut. |
| 3 | 10 | 15 | 525 | 11.13 | 3-3.5 | Fairly regular. |
| 4 | 9.5 | 13 | 535 | 11.93 | 3.32 | Chips very uniform. |
| 5 | 9 | 13 | 535 | | | Bad shattering, irregular width of cut. |
| 6 | 9 | 13 | 525 | 10.5 | 3.2 | Width very irregular. |

TABLE V

*Adjustment tests on a cutting machine of the invention*

WOOD: AMERICAN BIRCH

[Speed of rotation of diabolo: 400 r.p.m.]

| Test No. | Projection of knives in mm. | Normal width of cutter opening in mm. | Lever arm of counter-weights in mm. | Average lamella after shattering | | Remarks |
|---|---|---|---|---|---|---|
| | | | | Width in mm. | Thickness in mm. | |
| 1 | 6 | 13 | 525 | 7.5 | 2.45 | Fairly regular. |
| 2 | 7 | 13 | 525 | 7.90 | 2.47 | Good shattering, regular width. |

It should be observed that with the apparatus described and the positions indicated for the countreweights, the force transmitted to the wood by the pressure rollers varies approximately between 18 and 21 kilograms.

It will be noted from the foregoing tables that a very slight variation of certain adjustable parameters can influence the shattering of the log concerned in this construction of the apparatus according to the invention. Changes made to the principal characteristics of this machine also have an effect on the shattering. However, once the values of all of the parameters have been fixed for a given machine, any charge of a specimen of wood can be cut up into shattered chips after regulation of the machine to the appropriate settings.

It has also found that all woods, whether deciduous or resinous can be cut-up into shattered chips on the apparatus according to the invention.

Although it is preferable to feed the logs of wood to the blade-carrier drum in the direction of the wood fibres and substantially at right angles to the axis of the drum, it was also observed that the chips shatter at the moment when they are cut according to the invention even if the logs are fed in at a high angle of incidence with respect to the blades. The maximum angle of incidence at which shattering takes place to a noticeable degree is variable from one species of wood to another; the maximum value observed for any wood was of the order of 70°, that is to say the angle comprised between the cutting edge of the knives and the fibres of the wood is of the order of 20°.

It was also noted that the apparatus provide a simple method and means for obtaining a specific form of wood chip from any species of wood, the properties of this form being essentially predictable, constant and reproducible, and which are particularly suitable for fluid treatments without any other processing.

It will furthermore be understood that the present invention has been described only by way of explanation and not in any limitative sense, and that any useful modification may be made to it without departing from its scope. Particularly, the means driving the apparatus, or disposition of the log channel may be other than that illustrated with respect to the preferred embodiments. Thus, it is contemplated that the scope of the invention will encompass where even a vertical feed channel is used assuming that other equivalent structure is provided to attain the desired results.

Although the invention has been described in conjunction with preferred embodiments, particularly with respect to the apparatus for producing the desired chips it is to be understood that modification and variations may be resorted to without departing from the spirit and scope of the invention, as those skilled in the art will readily understand. Such modifications and variations are considered to be within the purview and scope of the invention and appended claims.

What is claimed is:

1. Apparatus for producing uniform natural wood chips particularly adapted for pulping and having "a coherent, porous fragile body of substantial uniform thickness having a series of loosely-interconnected, integral natural core lamellae disposed in substantially parallel planes, extending in the natural grain direction and interconnected by lignous fibers," comprising feed channel means defining a longitudinal path of travel for receiving a longitudinally disposed log of wood therein, power operated feed means projecting upwardly into said longitudinal path of travel for moving logs therealong, power-operated constraining-and-feed roller means suspended above and extending downwardly into said channel means and imposing a constant force toward said path of travel for preventing displacement of said log out of said longitudinal path of travel and cooperating with said feed means to positively feed said log, power means operatively connected to said power operated feed means and power operated constraining-and-feed roller means for simultaneously operating the same to feed at a predetermined speed along said channel, drive means mounting said constraining-and-feed roller means for simultaneous power operation and free-wheel movement for permitting a log to be drawn through said channel means at speeds greater than which said power operated constraining roller means is power-operated, and independently driven, rotating cutter means spaced from and downstream of said feed channel for engaging and shattering wood chips from the end of a log, said rotary cutter means including radial blades extending transversely of said longitudinal path of travel for engaging and rotating in a direction to draw a log longitudinally into engagement therewith at a speed greater than the rate of travel which said constraining roller means is power operated, said longitudinal path of travel defined by said feed channel means being disposed below a horizontal plane extending through the axis of rotation of said rotary cutting means, said rotary cutter means comprising an effective cutting area defined by a quadrant confronting said longitudinal path of travel and extending between said horizontal plane extending through the axis of rotation of said rotary cutting means and a second plane tangent to the lower periphery of said rotary cutter means.

2. The structure of claim 1 in which said constraining roller means is disposed immediately adjacent the effective cutting portion of said blades.

3. The structure of claim 1 including anvil means disposed at the downstream end of said feed channel means intermediately of said cutter means.

4. The structure of claim 1 in which said constraining roller means comprises at least one roller disposed on an axis of rotation parallel to the axis of rotation of said rotary cutter means, and a support pivotally mounted on a pivot axis extending transversely of said channel means and spaced from the axis of rotation of said rotary cutting means whereby the weight of said constraining roller means is imposed directly upon the log from which wood chips are produced.

5. The structure of claim 4 in which said constraining roller means includes adjustable load imposing means.

6. The structure of claim 5 in which said constraining roller means comprises at least a pair of parallel pressure wheels suspended immediately adjacent the effective cutting portion of said blades, said pressure wheels being disposed on an axis of rotation parallel to the axis of rotation of said rotary cutter means, said pressure wheels each being mounted for displacement perpendicularly of the longitudinal axis of said feed channel.

7. The structure as claimed in claim 5 in which said adjustable load imposing means comprises a lever connected to said support and extends away from said constraining means, and a plurality of weight elements adjustably mounted along said rod.

8. The structure as claimed in claim 1 in which said rotary cutter means comprises an open-ended drum including a pair of co-axial truncated conical sections joined at the smaller bases thereof.

9. The structure as claimed in claim 1 including a support mounted on a transverse axis above said feed channel means and spaced from said constraining roller means and upon which said constraining roller means is journaled for permitting said constraining roller means to be displaceable vertically in an arc relatively to said feed channel means, said constraining roller means comprising at least one counterbalanced roller having an adjustable moment arm for regulating the force imposed by said constraining roller means.

References Cited by the Examiner

UNITED STATES PATENTS

| 508,147 | 11/93 | Niethammer et al. | 144—181 |
| 817,382 | 4/06 | Merrill | 144—172 |
| 923,477 | 6/09 | Anderson | 144—172 |
| 2,559,701 | 7/51 | Becker | 144—172 |
| 2,652,077 | 9/53 | Alexander | 144—176 |
| 2,710,635 | 6/55 | Alexander | 144—326 |
| 2,825,373 | 3/58 | Forman | 144—172 |
| 2,827,934 | 3/58 | Latimer | 144—326 |
| 2,849,038 | 8/58 | Clark | 144—172 |

FOREIGN PATENTS 426,295 10/47 Italy.

LESTER M. SWINGLE, *Primary Examiner.*

WILLIAM W. DYER, JR., *Examiner.*